(12) United States Patent
Connell

(10) Patent No.: US 8,244,649 B2
(45) Date of Patent: Aug. 14, 2012

(54) STRUCTURED DIFFERENTIAL LEARNING

(75) Inventor: Jonathan Connell, Cortlandt-Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 12/540,738

(22) Filed: Aug. 13, 2009

(65) Prior Publication Data

US 2011/0040710 A1 Feb. 17, 2011

(51) Int. Cl.
*G06N 5/00* (2006.01)
(52) U.S. Cl. .......................... 706/12; 706/45
(58) Field of Classification Search .................... 706/12, 706/45
See application file for complete search history.

(56) References Cited

U.S. PATENT DOCUMENTS

| | | | |
|---|---|---|---|
| 6,099,320 A | 8/2000 | Papadopoulos |
| 6,315,572 B1 | 11/2001 | Owens et al. |
| 6,519,445 B2 | 2/2003 | Casey-Cholakis et al. |
| 6,685,482 B2 | 2/2004 | Hopp et al. |
| 2002/0161732 A1 | 10/2002 | Hopp et al. |
| 2004/0209232 A1 | 10/2004 | Neumann et al. |

OTHER PUBLICATIONS

Rosenberg, Automatic Detection and Classification of Prosodic Events, Doctoral Thesis, Columbia University, 2009, pp. 1-407.*
Sarawagi, Sunita, et al., "Accurate Max-Margin Training for Structured Output Spaces," Proceedings of the 25th International Conference on Machine Learning, Helsinki, Finland, 2008.
Xu, Linli, et al., "Discriminative Unsupervised Learning of Structured Predictors," Proceedings of the 23rd International Conference on Machine Learning, Pittsburgh, PA 2006.
Miao, Yongwu, et al., "CSCL Scripts: Modelling Features and Potential Use," Proceedings of the 2005 Conference on Computer Support for Collaborative Learning: Learning 2005: the next 10 years!, Taipei, Taiwan, pp. 423-432, 2005, ISBN: 0-8058-5782-6.
* cited by examiner

*Primary Examiner* — Wilbert L Starks
(74) *Attorney, Agent, or Firm* — Jose Gutman; Fleit Gibbons Gutman Bongini & Bianco PL

(57) ABSTRACT

A method and information processing system train a control system using structured differential learning. A set of features extracted from a set of input data is analyzed by a plurality of analyzing components. An output response is generated by each analyzing component in the plurality of analyzing components for each feature regarding whether the each feature has an acceptable value associated therewith relative to a value of the parameter associated with the each analyzing component. A confidence score is associated with the each output response. Each output response and each confidence score is combined into a single final output response and single final confidence score. An analyzing component is identified from the plurality of analyzing components that is a strongest candidate for generating an incorrect final output response based at least on the confidence score.

25 Claims, 9 Drawing Sheets

STRUCTURED DIFFERENTIAL LEARNING

FIELD OF THE INVENTION

The present invention generally relates to control systems, and more particularly relates to training control systems using a structured differential learning system.

BACKGROUND OF THE INVENTION

Control systems are generally used to automate one or more given functions or operations. For example, there are a number of self-tuning control systems such as robot manipulator controllers that adapt to gravity loads, and engine controllers that change the fuel-air mixture as the temperature varies, among others. One problem with current control systems is that they generally require real-time feedback on task performance to alter their performance into the optimal regime. In many tasks such ground truth feedback is not available at run-time.

There are also a number of supervised learning techniques that can be used to train control systems. Some examples of the supervised learning techniques are Support Vector Machines (SVM), Bayesian Networks (BN), Artificial Neural Networks (ANN), Classification and Regression Trees (CART), perceptrons, and C4.5, among others. However, these approaches are typically applied in a tabula rasa (blank slate) configuration and as a single black box. Therefore, when these conventional supervised learning techniques are used to train control systems it is difficult to bias the systems into a known semi-optimal starting state. Another problem is that it is also difficult to impart useful system structural knowledge, even when it is known in advance. These various drawbacks result in such systems generally requiring quite large amounts of data to learn the underlying function well. Acquiring this voluminous data, as well as the ground truth needed for training the system can be time-consuming and expensive.

SUMMARY OF THE INVENTION

In one embodiment, a method for training a control system using structured differential learning is disclosed. The method comprises analyzing a set of features extracted from a set of input data by a plurality of analyzing components. An output decision is generated by each analyzing component in the plurality of analyzing components for each feature regarding whether the each feature has an acceptable value associated therewith relative to a parameter associated with the each analyzing component. A confidence score is associated with the each output decision. Each output decision and each confidence score is combined into a single final output decision and single final confidence score. An analyzing component is identified from the plurality of analyzing components that is a strongest candidate for generating an incorrect final output decision based at least on the confidence score.

In another embodiment a method for training a control system using structured differential learning is disclosed. The method comprises comparing each decision information set in a plurality of decision information sets from a structured differential learning module to a corresponding ground truth data element. Each decision information set indicates a set of decisions generated by the structured differential learning module with respect to a set of features extracted from a set of input data. The corresponding ground truth data element indicates a correct decision with respect to the set of features. Each decision information set is associated with a trace information set comprising at least one or more alternative values and a feature analyzing component identifier associated with a feature analyzing component that the decision information set was based on and that is adjustable by the one or more alternative values. Each decision information set is classified as one of correct and incorrect based on the comparing. An alternative value is selected for each incorrect decision information set for adjusting the feature analyzing component in the trace information set based on all the alternative values for each decision information set that is one of correct and incorrect and comprises the same feature analyzing component in the trace information set.

In yet another embodiment, an information processing system for training a control system using structured differential learning is disclosed. The information processing system includes a memory and a processor that is communicatively coupled to the memory. A structured differential learning module is communicatively coupled to the memory and the processor. The structured differential learning module is adapted to extract a set of features extracted from a set of input data is analyzed by a plurality of analyzing components. An output decision is generated by each analyzing component in the plurality of analyzing components for each feature regarding whether the each feature has an acceptable value associated therewith relative to a parameter associated with the each analyzing component. A confidence score is associated with the each output decision. Each output decision and each confidence score is combined into a single final output decision and single final confidence score. An analyzing component is identified from the plurality of analyzing components that is a strongest candidate for generating an incorrect final output decision based at least on the confidence score.

In another embodiment, an information processing system for training a control system using structured differential learning is disclosed. The information processing system includes a memory and a processor that is communicatively coupled to the memory. A structured differential learning module is communicatively coupled to the memory and the processor. The structured differential learning module is adapted to compare each decision information set in a plurality of decision information sets from a structured differential learning module to a corresponding ground truth data element. Each decision information set indicates a set of decisions generated by the structured differential learning module with respect to a set of features extracted from a set of input data. The corresponding ground truth data element indicates a correct decision with respect to the set of features. Each decision information set is associated with a trace information set comprising at least one or more alternative values and a feature analyzing component identifier associated with a feature analyzing component that the decision information set was based on and that is adjustable by the one or more alternative values. Each decision information set is classified as one of correct and incorrect based on the comparing. An alternative value is selected for each incorrect decision information set for adjusting the feature analyzing component in the trace information set based on all the alternative values for each decision information set that is one of correct and incorrect and comprises the same feature analyzing component in the trace information set.

Additionally, one or more embodiments are directed to training a headlight control system. In one embodiment, a comparison is made of each feature in a plurality of features associated with a target object identified in a set of input data to a threshold value associated with a corresponding parameter in a plurality of parameters for an object type. A first response is generated for each feature based on the feature being one of below, above, and equal to the threshold value of the corresponding parameter. A confidence score is associated with the first response based on a delta between the characteristic and the threshold value. A second response is generated indicating that the target object is one of the object type and fails to be of the object type. This second response is generated based at least in part on the first response for each characteristic and each corresponding parameter. An identification is made for the second response as to which parameter in the plurality of parameters is the strongest candidate for causing the second response to be incorrect. A new threshold value is generated for the parameter that has been identified in response to the identification being made. The second response, an identifier associated with the parameter that has been identified, and the new threshold value is stored in a memory.

One or more of the embodiments of the present invention compare each response information set in a plurality of response information sets from a structured differential learning module to a corresponding ground truth data element. Each response information set indicates whether a target object identified in a corresponding set of input data is one of an object type and fails to be an object type. Each corresponding ground truth data element correctly indicates that the target object is one of the object type and fails to be of the object type. Wherein each response information set is associated with a trace information set comprising at least an alternative threshold value and a parameter to be adjusted by the alternative threshold value. Each response information set is classified as one of correct and incorrect based on the comparison. An alternative threshold value is selected for each incorrect response information set. The alternative threshold value changes the parameter in the trace information set based on all the alternative threshold values for each response information set that is one of correct and incorrect and comprises the same parameter in the trace information set.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Overview

Figure 1:
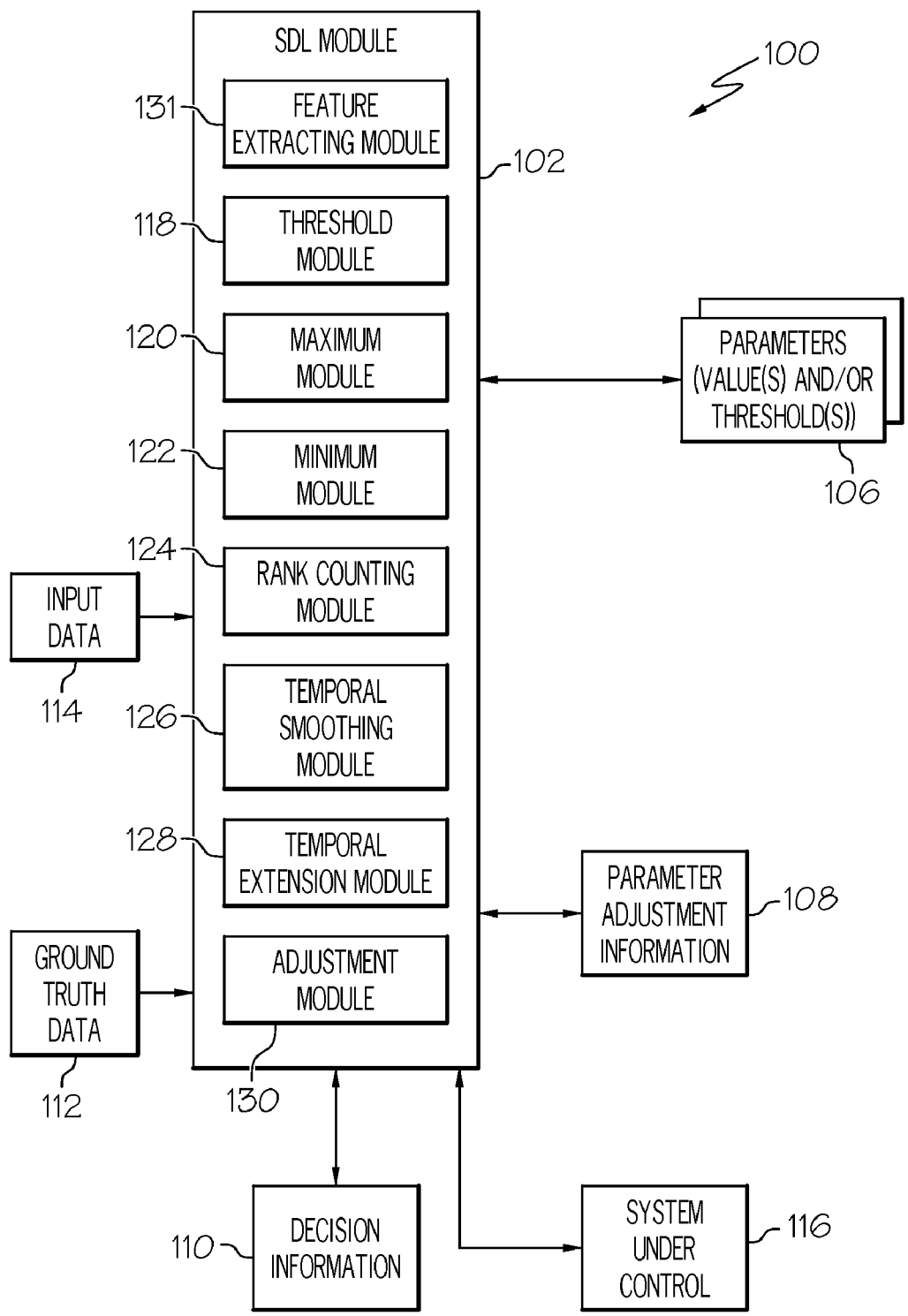
FIG. 1 is a block diagram illustrating a high level overview of an operating environment according to one embodiment of the present invention.

The SDL system 100 of FIG. 1 allows "structured" systems to be automatically tuned up. That is, the system being tuned is not a single black box with inputs and outputs (like an SVM) but instead is generally a hand-crafted system with multiple parts (the structure). The SDL system 100 makes "differential" changes, it does not learn a complete system from scratch, unlike many machine learning tabula rasa approaches. In one embodiment, the parameters in a system are set to approximately correct values already and the SDL system 100 makes small adjustments to boost the overall performance of the system over a particular set of training data.

As a consequence of being only a differential learner, SDL attempts to attribute each output error to a single cause. While there may be many possible adjustments or sets of adjustments that will correct an error, spreading the examples among many causes defocuses the system and makes it slower to converge. Also it is assumed that the system already performs reasonably well, so the SDL system 100 does not need to adjust a large number of parameters simultaneously. The SDL system 100 also uses the "near miss" heuristic so that if a proposed change is too large it can be rejected. Instead the system 100 waits until it receives a less ambiguous example.

In the most general case the SDL system 100 includes a number of response generators and a number of combinators. A response is an output and can be as varied as, for example, a vector of robot arm joint velocities, a histogram of at least one answer desirability, a scalar steering angle, a Boolean value, or the like. Response generators also produce a confidence indicator associated with their response and a module identifier for themselves. Combinators then merge responses of the same kind from different generators to form a single new response and confidence. The module identifier output by a combinator is typically the input which is most easily changeable, i.e. the one with the lowest confidence. Thus, the connection to and from combinators consist of triples <R,C, M> with response R, confidence C, and module indicator M.

The basic operation of the SDL system 100 includes a forward control pass followed by a backwards training pass. After the forward pass is completed the final output response is compared to the desired response. If the output is correct, the module associated with the final output module indicator is told that it generated the correct output for its current inputs. If the output is wrong, however, the system 100 must derive the proper output for the indicated module. For this reason it is important that the combinators be single-point invertible, at least in some cases. That is, to generate a particular different output response, each combinator is able to figure out how to change some particular input response to achieve this.

For example, suppose responses were simple numbers and the combinator was R=X+Y. If X=2 and Y=3 then R=5. Now suppose the "correct" answer should have been R=8. How can X or Y be changed to have this happen? For single point invertibility the systems 100 freezes all the inputs except one and then works backwards from the output. In this case if the system 100 freezes X at 2, then system 100 determines that Y needs to be 6 to make the output R=8. Similarly, if the system 100 freezes Y at 3 instead, then X needs to be 5 to achieve the desired output response. Although there are many possible combinations of X and Y that can result in R=5, because the system 100 only looks for a single point of "failure" there are only two possibilities, as discussed above. This can be extend to more complicated combinators like R=(X+Y)/Z. Let X=5, Y=7, and Z=2 to give R=6. If the system 100 desires R to be 4 the system 100 can either set X=1, Y=3, or Z=3 leaving the other inputs unchanged.

Sometimes, however, it is not possible to identify plausible alternative input values. Take the case R=X/Y. If X=6 and Y=2 then R=3. If the system 100 wants R=2, then the system 100 can set X=4 or Y=3, as before. Now suppose the system 100 wants R=0. The system 100 can clearly set X=0, but there is no finite value the system 100 can set for Y that will give this result. Even worse would be if Y was already zero giving R=6/0=infinity. To force R=0 there is no single finite substitution the system 100 can make for either X or Y (since 0/0=1). Thus, the combinator R=X/Y is only sometimes single point invertible.

Although the SDL system 100 can be created for a wide range of response types, in one embodiment, this system specializing to Booleans is particularly useful. This embodiment also allows a number of shortcuts to be applied. First, the system 100 combines the response R and confidence C into a single decision D. The magnitude of D encodes the confidence while the sign of the decision indicates true or false. Second, for each module there are not a huge number of possible alternative responses, there is only one (e.g. false instead of true). This generally means the system 100 can determine during the forward pass the "corrected" response for each module should such correction be deemed desirable during the backwards pass. Moreover, the adjustment for each module often comprises setting some parameter to a different value. Thus, the system 100 splits the module indicator M into a parameter indicator P and an alternative value A. So instead of combinators communicating with <R,C,M> triples, they use <D,P,A> triples instead. This also means no explicit backwards pass is needed since all the relevant activities have already been "pre-compiled" into the forward pass.

Operating Environment

According to one embodiment, FIG. 1 illustrates a general overview of one operating environment/system 100 according to one embodiment of the present invention. In particular, FIG. 1 shows a structured differential learning (SDL) system 100. In one embodiment, the SDL system 100 is deployed in the context of a control system and learns to generate an appropriate output value in response to various input stimuli. However, this is only one example applicable to the various embodiments and does not limit the present invention in any way. The performance of the SDL system 100 is improved by providing input with the correct values to generate for a sample series of stimulus configurations. It should be noted that the SDL system 100 is not required to be deployed within a control system. It should also be noted that although the following discussion uses a vehicle headlight control system as one example of a control system, the various embodiments of the present invention are also applicable to any type of control system.

One advantage of the various embodiments of the present invention is that the SDL system 100 comprises multiple components rather than a single black box. In particular, there are multiple discrete parameters that control the operation of such a system. However, by using specially crafted thresholding and combination methods the dependence of the final value on these various parameters can be determined. In one embodiment, the SDL system 100 tallies "near misses" and "near hits" where changing a single parameter value is likely to change the overall result. These tallies are used in conjunction with the ground truth to determine which parameters to adjust and by how much.

Because the system 100 has internal structure, it is possible to use as much task knowledge as is available to build an approximately correct system before training. The control parameters of the SDL system 100 can also be hand-set to give reasonable performance at the start. However, because the SDL system 100 can learn, the system 100 is still flexible and can be adapted to new conditions just by showing it some input-output examples.

Another advantage of the SDL system 100 is that it can generally achieve a high level of performance with less data than a monolithic system. Because the SDL system 100 has internal structure the learning problem is generally broken into smaller parts which are each solvable with less data. Also, because the parameters can be initially hand-tuned, the system 100 is generally less far away from an optimal solution and hence requires less data to move its operating point the small distance needed. Moreover, because the initial parameters bias the system 100 into the approximately correct region of parameter space, there is less chance of getting stuck in a local minimum of the error function.

Unlike adaptive control systems, the SDL system 100 can be trained in "batch mode" off-line and then the parameters frozen to form a better control system. This obviates the need for any sort of run-time feedback signal, which may be difficult to obtain or expensive to compute in many situations.

In one embodiment, the SDL system 100 includes an SDL module 102. The SDL system 100 also include one or more parameters 106 that analyzing or comparison modules associated with one or more given features use to compare values associated with features extracted from input data 114 by feature extractor 131. These analyzing or comparison modules can either be separate modules within the SDL module 102 or the SDL module 102 itself. For example, an analyzing or comparison module for a feature type "area" can be associated with a parameter value such as value or threshold of 5. An area feature extracted from the input data 114 can be associated with a value of 4. Therefore, the "area" analyzing/comparison module compares the "area" feature type parameter of 5 against the extracted "area" feature value of 4. The parameter 106 can either be one or more values that are compared to an extracted feature value to determine if the extracted feature value equals or does not equal the parameter. Alternatively, the parameter can be one or more thresholds that are compared to an extracted feature value to determine if the extracted feature value is above, below, or equal to the parameter. Still another option is for a pair of parameters to specify the center and width of a Gaussian bandpass function.

The SDL system 100 also includes parameter adjustment information 108, decision information 110, input data 114, and ground truth data 112. The SDL module 102, in one embodiment, is communicatively coupled to a system to be controlled 116. For example, the SDL system 100, in one embodiment, can be used to inform a headlight actuation system when high-beams/low-beams should be activated/deactivated.

The SDL module 102, in one embodiment, includes a threshold module 118, a maximum module 120, a minimum module 122, a rank counting module 124, a temporal smoothing module 126, a temporal extension module 128, and an adjustment module 130. The SDL module 102 and each of the above modules are discussed in greater detail below.

Structured Differential Learning System

The following is a more detailed discussion on the SDL system 100 of FIG. 1. The following discussion uses an example of identifying headlights within images for training a headlight control system to identify headlights and non-headlights such as taillights, street lights, stop lights, reflections, etc. An example of this process is discussed in more detail with regard to FIG. 4. As discussed above, this is only one example applicable to the various embodiment of the present invention.

In one embodiment, the SDL module 102 receives one or more sets of input data 114. In the current example, the input data 114 is based on video or still picture images. The input data 114 can either be a set of features such as brightness, blob size, blob location, blob intensity, and the like that are associated with a set of video or still picture images, or can be the actual video/still picture images themselves. In the embodiment where the input data 114 is the actual video/still picture images the feature extracting module 131 extracts the features such as brightness, blob size, blob location, blob intensity, and the like from the images.

The SDL module 102, via the threshold module 118, compares these extracted features to the thresholds 106 that are associated with each of the feature types (e.g., blob size) and determines if the extracted feature is above, below, or equal to the parameter(s) 106. It should be noted the throughout this discussion that a "parameter" is referred to as a "threshold 106" for illustrative purposes. However, it should be noted that a threshold is only one example and the parameter 106 can also have a single value or multiple values that are compared against a feature value to determine whether or not the feature value is equal to or not equal to the value(s) of the parameter. In the embodiment where the parameter 106 is a threshold 106, the SDL module 102 determines how "far" or "close" to the threshold 106 the feature value is.

In the current example using a headlight control system, the features are used to determine whether an object within the input data 114 associated with the features is an object of interest. In the current example, identified objects are "spots" or "blobs" and objects of interest are headlights of on-coming vehicles or any other object type such as taillights, streetlights, stoplights, and the like. The SDL module 102 analyzes the input data 114 to identify suitable spots. These spots essentially comprise connected components of pixels above some light intensity threshold. Various categories of spots can be identified by the SDL module 102 such as bright spots that might plausibly be headlights and dimmer spots such as taillights. Features/characteristics of an identified spot such as spot area (e.g., pixel count), a bounding box (min/max x/y), and a color indication (sum of red, green, and blue plus max red) are extracted by the SDL module 102 via the feature extracting module 131 according to the present example.

In one embodiment, spots are identified within an image/image frame (i.e., input data 114) by performing a more complicated connected component analysis with various intensity thresholds. An intensity scale-space analysis is then used to ensure that each spot is unimodal. That is, a spot is split into two or more objects at a dimmer threshold if it is found to contain two or more separate spots at a brighter threshold. Also, to prevent excessive blooming around lights the core of the light is tracked down through the intensity levels until it is bigger than some area threshold. Thus, even unimodal spots are sometimes "trimmed".

The SDL module 102 then analyzes each of the identified spots to determine if the spot is an object of interest such as a headlight, streetlight, taillight, etc. In general, a spot is a headlight (in this example) if the spot meets a size requirement and is near the horizon in the image. This is represented by three tests: area>amin, y>ymin, and y<ymax in the current example. In other words, the spot data (e.g., extracted features) are compared against the thresholds 106 for these types of features such as "amin", "ymin", and "ymax", each feature type having one or more given parameters 106 such as thresholds and/or values. Other features for the headlight example can be, but are not limited to, the shape of the spot, the color of the spot, etc. It should be noted that if an object of interest has various types such as headlight, taillight, streetlight, stoplight, etc., then the acceptable bounds for each feature type can be different for each of these different objects types (e.g., red for taillights, white for headlights, etc.) and may be different between the singleton and paired version of each type (e.g., taillights). These bounds can be learned by the SDL system 100 based on labeled/annotated ground truth video examples, as is discussed in greater detail below.

The SDL module 102 compares the extracted features to the corresponding thresholds 106 via one or more analyzing components, such as the threshold module 118. The threshold module 118, in one embodiment, returns "true" if a value is at or above the threshold value, and "false" otherwise and stores this decision information in a decision information database 110, memory, or the like. For example, if the spot currently being analyzed has an area feature value of 4 and the threshold for this feature type is 3 then the threshold module 118 returns a value of "true". The threshold module 118 performs this comparison for each extracted feature. This decision information is then stored within the decision information database 110, memory, or the like. Alternatively, the threshold unit 118 can return "true" when the value is below some limit, instead. The SDL module 102 then assigns a confidence score to the value. The score of such a decision (e.g., true or false) is based on how close the value is to the threshold 106. This can alternatively be conceived of as the "effort" needed to move the threshold 106 to change the overall decision. The score information can also be stored in the decision information database 110, memory, or the like, as well.

In other words, the thresholds 106 are adjustable. A figurative example is to consider the threshold 106 as being attached by a spring to the current value. Any deviation requires an effort proportional to the change, where the proportionality is governed by the spring constant. Beyond a certain deflection the spring will bend no more and the effort saturates. This leads to a scoring function with a single slope around the current setting, similar to a fuzzy logic predicate. In one example, a score of a comparison range can be from −100 (definitely false), to 0 (unsure), to +100 (definitely true); however, the various embodiments of the present invention are not limited to this example. For example, with respect to the intensity example given above, the intensity value of the spot can be given a confidence score of +25 on a scale of −100 to +100, thereby indicating a degree of given degree of certainty in the decision.

Figure 7:
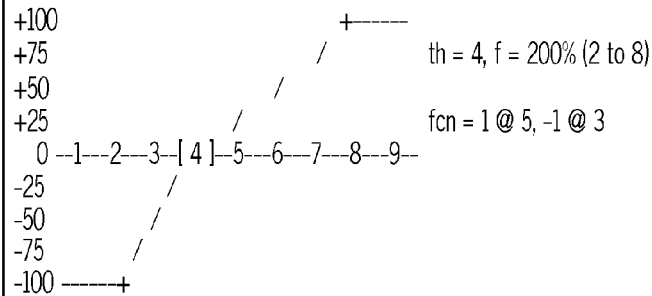
FIG. 7 is a graph illustrating a dual-slope linear threshold according to one embodiment of the present invention.

This range might be an absolute deviation, a linear percentage change in value, or a logarithmic percentage change in value. The logarithmic response can be approximated by a dual-slope linear threshold where the response is "stiffer" for value below the current threshold, as shown in FIG. 7, where "val" is the value being evaluated; "th" is the current threshold, and "sc" is the score of the decision/response. The type of the threshold and the associated slopes are part of parameter adjustment information 108.

These graded response values can be combined in a number of ways. In one embodiment, the SDL module 102 utilizes logical AND and OR to combine these responses. These logical ANDs and ORs can be implemented (again, as in fuzzy logic) using the minimum and maximum modules 120, 122, respectively. Two threshold modules 118 can then be used on a single value to simulate "bandpass" filters (with AND) and "notch" type filters (with OR). Moreover, multiple criteria, such as constraints on a variety of different measurements, can be combined using AND. Similarly, multiple different independent justifications for the same result can be combined using OR.

A main difference from fuzzy logic is that these combination methods of the SDL module 102 also attempt to record the most "defeasible" of their inputs. The AND module 122 records which input had the lowest confidence value. If the result was true, then changing just this weakest value (called the "suspect") to false will change the overall decision to false. However, if two or more inputs are false then there is no clear choice and the decision is indefeasible. That is, credit assignment cannot be performed backwards through the AND in this case.

For example, assume that the threshold module 118 has compared the extracted features associated with a spot to all of the corresponding thresholds 106 and the SDL module 102 determines that the spot is a headlight when in actuality the spot was a streetlight. Therefore, the SDL module 102 identifies the weakest feature such as area, brightness, position and its parameter 106 (i.e., the most suspect feature/parameter) and determines how to change the parameter 106 of this feature so that the decision changes from "headlight" to "non-headlight". For example, if the feature that was the most likely suspect or the strongest candidate for causing an incorrect decision (e.g., decision indicated a headlight was detected when in actuality the spot was not a headlight) was the area feature, the SDL module 102 determines an alternative value for the threshold 106 so that the overall decision indicates that a headlight was not detected.

For example, if the original value for the extracted area feature was 4 and the original threshold for this weakest feature was 3 then changing the threshold 106 to 7 causes the threshold module 118 to return "false" as compared to "true" with the original threshold. Therefore, by changing the threshold 106 the SDL system 102 now determines that a spot with these specific features is not a headlight.

With respect to the logical OR module 120, a similar operation is performed and the strongest input is recorded. If there is only one true input, then changing this to false will change the overall result to false also. However, if there are two or more true inputs then the function is no longer defeasible: there is no single pivot point ("suspect") for the decision.

There are also more complicated combination functions as well. One of these more complicated functions is counting. Consider the application of switching a vehicle's headlights from high-beam to low-beam based on the input from a video camera. The SDL module 102 can find potential headlights, taillights, and streetlights as bright connected components in the input image. These can then be filtered based on properties such as minimum brightness, maximum area, maximum vertical elongation, etc., using the threshold module 118, maximum/minimum modules 120, 122, and the AND modules, as discussed above, to sort them into classes. This results in an image with all the blobs (i.e., spots) labeled by their "degree of membership" in the various classes.

Now suppose the proposed logic control system 116 is to turn the high-beams off if the camera sees 3 or more streetlights. The rank counting module 124, in this embodiment, counts the number of candidates that are true. In other words, the rank counting module 124 counts the number of spots discussed above that have been determined (i.e., have a true decision) to be streetlights. If there are more than 3 then the result of this test (have 3 or more streetlights been detected) is true and indefeasible—there is no one change that the SDL module 102 can make that will flip the decision. If there is only 1 then the decision is false and indefeasible. The more interesting cases are counts of 2 or 3. If there are exactly 3 then the decision is obviously true, but only defeasible if one of the 3 true candidates is defeasible itself. The case for 2 is a little more complicated. The output is definitely false, but the defeasibility depends on the strongest of the defeasible false candidates. That is, if the rank counting module 124 can identify any one false candidate that can be flipped to true, then the whole counting decision can be flipped also.

The SDL module 102 can also consider the meta-level. What if the count threshold had been only 2 street lights, or maybe 4 street lights instead? Changing the required count could thus potentially change the module output, too. For this reason the SDL module 102 uses the rank counting module 124 to scan the whole rank order and find out at what cardinality the output decision would change. Then, as with the simple threshold modules, the required "effort" to change the count can be calculated. In one embodiment, a dual-slope pseudo-logarithmic function can be used to perform this calculation.

Various embodiments can be used to combine the raw count information with the parameter adjustment information 108. One embodiment takes as the score the most defeasible (closest to zero) of the two scores. Then, since parameter adjustment is a meta-level operation, the original "suspect" parameter is kept if one of the candidates was defeasible. If the original count was not defeasible, the count threshold itself is recorded as the "suspect" parameter. This combination method lets the "blame" percolate backwards through the counting process rather than pinpointing the count threshold itself most of the time (as other combination methods do).

Figure 8:
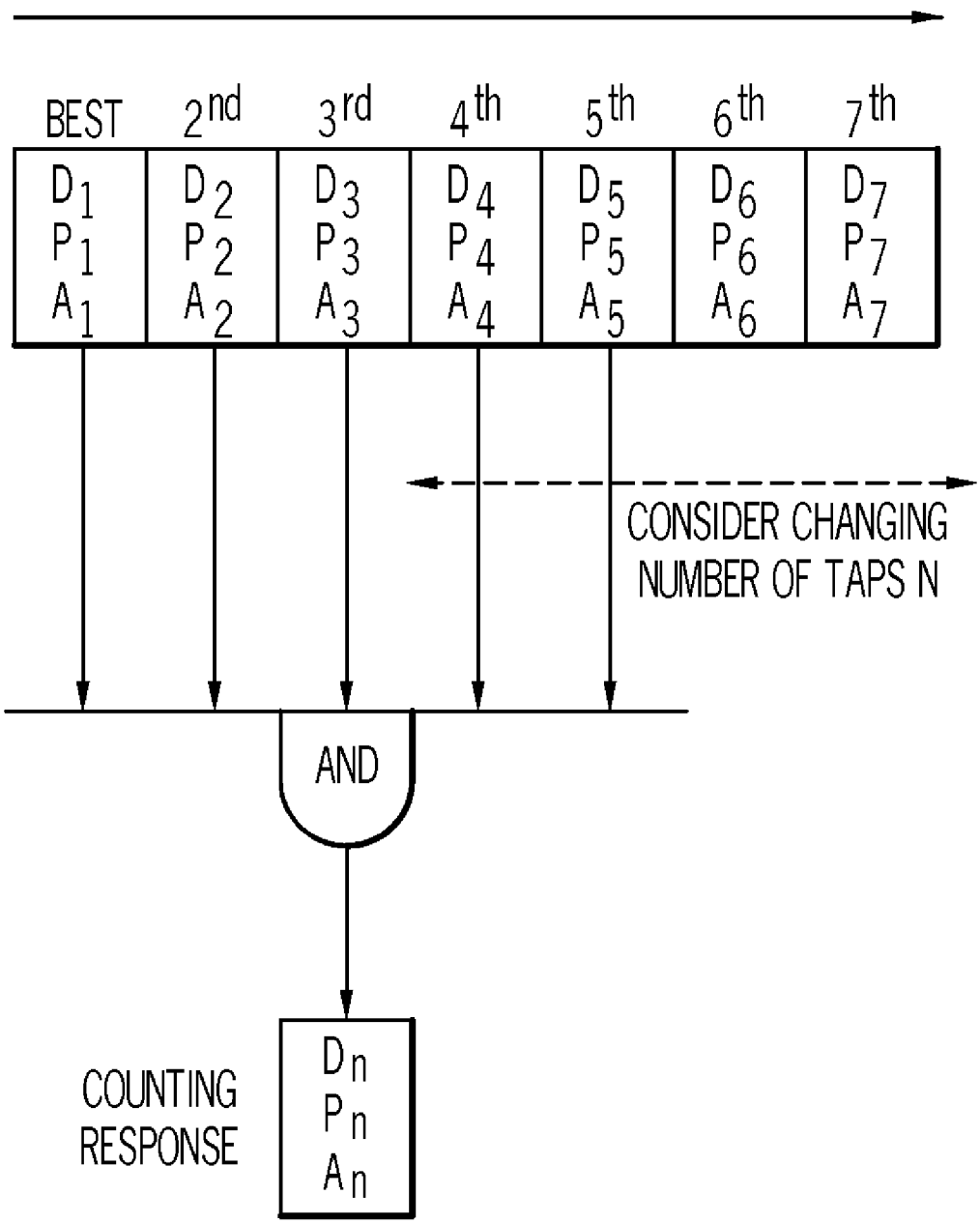
FIG. 8 illustrates one example of a rank counting module according to one embodiment of the present invention.

The counting operation can also be viewed as the SDL system 102 combining outputs from the same module operating on different inputs (i.e. spots). In one embodiment, it does this by building a list of objects ranked by the confidence score indicating a confidence that these spots are streetlights. The SDL module 102 then determines if the first N of them passed the test. This is essentially connecting an N-input AND gate (as described previously) to the first N elements in the ranked list. FIG. 8 shows a schematic for a counting module 124 that performs the operations discussed above.

There are also ways to perform similar operations for filtering data by taking the minimum over a temporal span using the temporal smoothing module 126, and extending a decision by taking the maximum over some interval using the temporal extension module 128. These two methods can be combined into a structure called a retriggerable "monostable". The retriggerable monstable waits for several true triggering events in a row (using min), then generates a fixed length true pulse (using max) even when the triggering signal disappears. The output pulse can be lengthened if additional triggering events occur during the extension interval. For example, even thought the SDL module 102 may detect headlights in one frame, headlights may not exist in the next frame. Therefore, the monostable can be used to ensure that headlights are detected in a given number of frames or are not detected in a given number of frames. As with the counting module, the time constants of the component temporal min and temporal max modules of the monostable are also susceptible to alteration. That is, in certain circumstances they can be marked as the "suspect" parameter associated with the final output.

Figure 9:
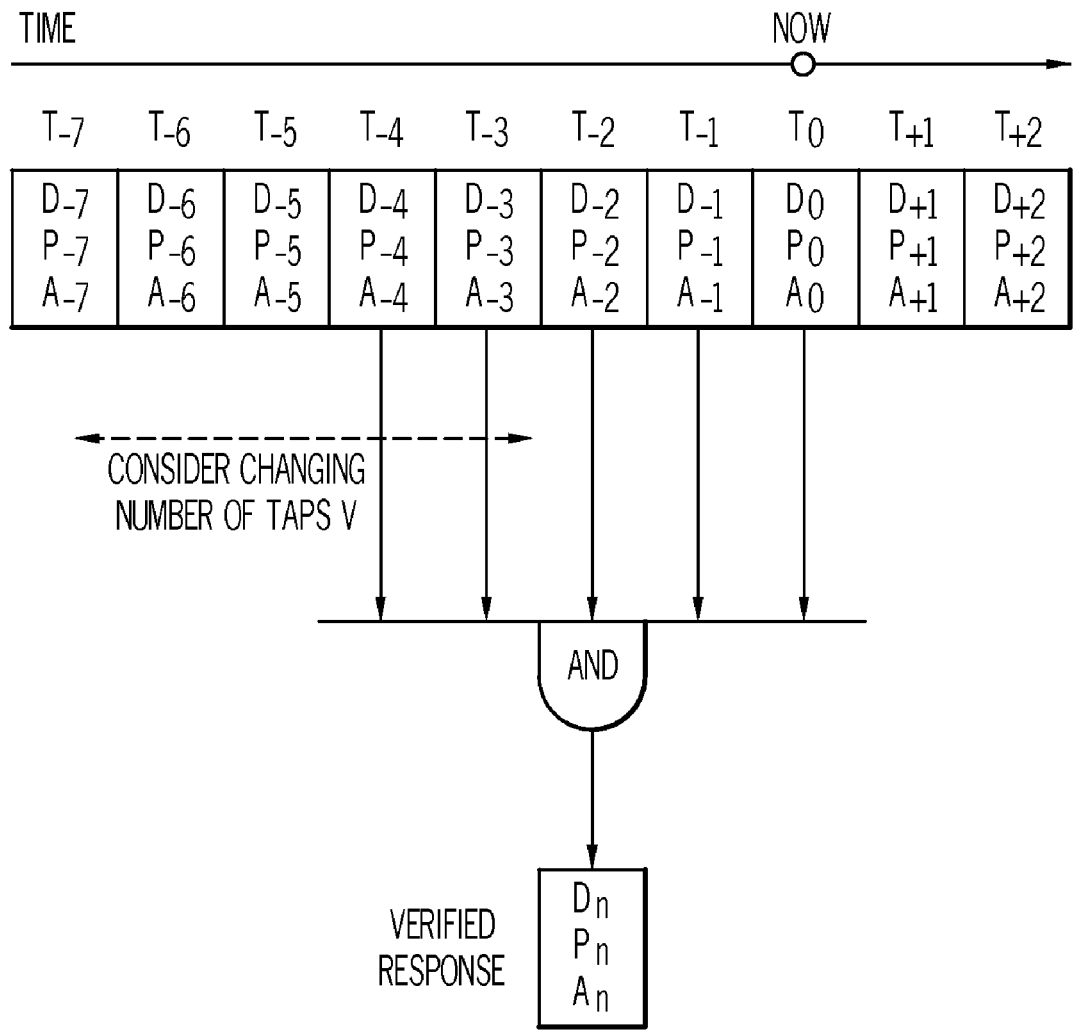
FIG. 9 illustrates one example of a temporal smoothing module according to one embodiment of the present invention.

Temporal smoothing combinators generally do not take values from different response generators, but instead values from the same generator over time. FIG. 9 shows a sequence of <D,P,A> triples over a short time interval. By feeding these to an AND gate using a sliding window the SDL module 102 can make sure that some condition is true for at least V consecutive time frames (5 in the diagram). As before, the AND gate generally derives its reported P and A from the weakest of these time instants.

However, the SDL module 102 can also contemplate what would happen if only 4 consecutive occurrences or perhaps 7 were required instead. To determine a useful alternative value the SDL module 102 scans the inputs for a small range past the nominal time constant to find the first false input. That is, for the example in FIG. 7 where V=5, the SDL module 102 scans from $t_0$ to $t_{-7}$. If the first false was found at $t_{-4}$ then the output of the AND gate as shown would be false. However the SDL module 102 could make it be true if the temporal smoothing module 126 instead only considered the first V=4 elements ($t_0$ to $t_{-3}$). Now suppose that the first false input is found at $t_{-6}$, which means the output of the AND gate is true ($t_0$ through $t_{-4}$ are all true). If the SDL module 102 wants to change this to false the SDL module 102 can set V=7 to include this first false input.

In both these cases the SDL module 102 can then use a ramped threshold centered at V=5 to assign a confidence to such a change. It may be that altering V is less "expensive" than adjusting any of the inputs. In such a case the parameter V itself is be reported in the output along with the appropriate alternative number of taps for the AND gate. This is a particularly useful fall-back position if none of the inputs is defeasible (i.e. they are all stuck at true or false with very high confidence).

Figure 10:
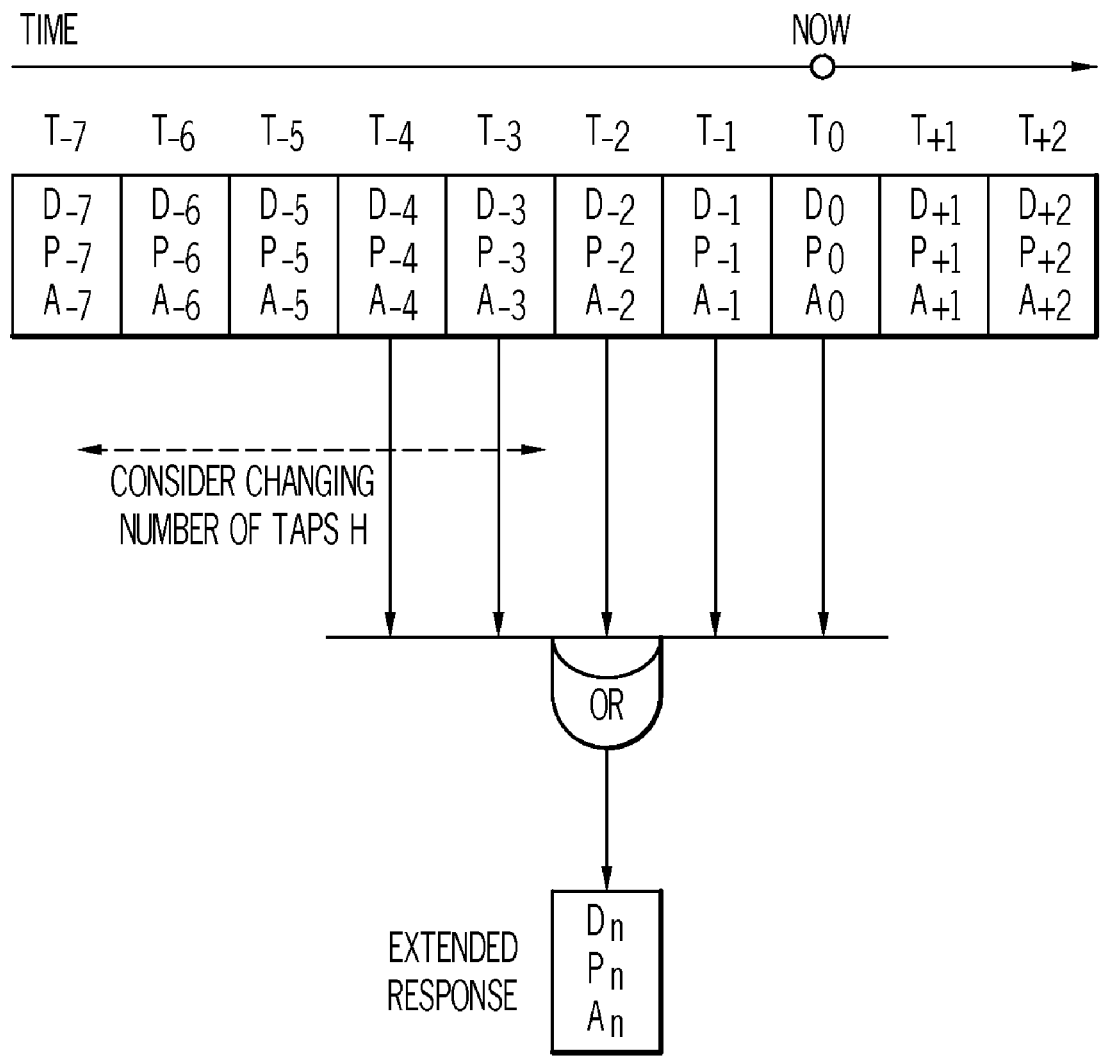
FIG. 10 illustrates one example of a temporal extension module according to one embodiment of the present invention.

The implementation of the temporal extension module 126 is very similar to the temporal smoothing element described earlier, except it uses OR to combine inputs over time as shown in FIG. 10. As with the temporal smoother, alternative values for the time constant are also considered and assigned confidence values. So, if a change of output truth value is desired, the temporal extender may suggest changing its own time constant rather than altering any parameter associated with its inputs. There is, however, one difference that has proved to be useful in practice. In the case where multiple inputs are true a normal OR gate would not be able to find any one input that could be changed to change the overall result. The temporal extension module 126 relaxes this and instead rotates blame among the various true inputs.

The SDL module 102 can also use a histogram module (not shown) that generates a graded response based on the fraction of data below a certain value threshold. For instance, the module might test whether or not 30% of the pixels in an image were below a gray value of 50. The raw fraction would be passed through a single-ramp threshold function running, say, from −100 at 25% to +100 at 35%. At the meta-level the threshold itself could also be assessed as a potential "suspect" feature/parameter. That is, what if the threshold was set to 45 or 55 instead?

Even further, the SDL module 102 can utilize spatial projection modules (not shown). This is useful for evaluating rectangular regions of images. Suppose the histogram in the previous example was computed over just a particular rectangular region of the image with, say, 100<x<200 and 50<y<100. What would happen if the lower x limit was changed to 95 instead? This meta-level adjustment can be evaluated in the same way as the histogram threshold discussed above, and thus the x limit can also become a potential "suspect" feature/parameter.

Once the SDL module 102 has analyzed the input data 114, the SDL module 102 generates decision information 110 including the associated confidence score and parameter adjustment information. This can be done for a long series of inputs, such as all the frames in a video, to form a database 110 of decisions. The SDL module 102 can then, via the adjustment module 130, adjust one or more of the thresholds 106 associated with a feature type to perform more accurate decision making operations. This process is discussed in more detail below with regard to FIG. 5.

Using this ground truth data 112 the SDL module 102 can classify each decision in the decision information database 110 as correct or wrong. The system responses (e.g., object was a headlight or not a headlight) can be assigned to one of four possible categories based on the ground truth data 112. The first category is true positives (TP) where both the ground truth data 112 and the SDL module 102 indicated "true" (i.e., the object was a headlight). The second category is true negatives (TNs) where both the ground truth data 112 and the SDL module 102 indicated "false". The third category is false positives (FP) where the ground truth data 112 indicated "false", but the SDL module 102 indicated "true". That is, the SDL module 112 erroneously indicated "true". The fourth category is false negatives (FNs) where the ground truth data 112 indicated "true" and the SDL module 102 indicated "false". That is, the SDL module 102 erroneously indicated "false". Some of the results are defeasible while others are not. In one embodiment, only the defeasible results are of concern—particularly their designation of a suspect feature/parameter and the associated alternative value.

Figure 2:
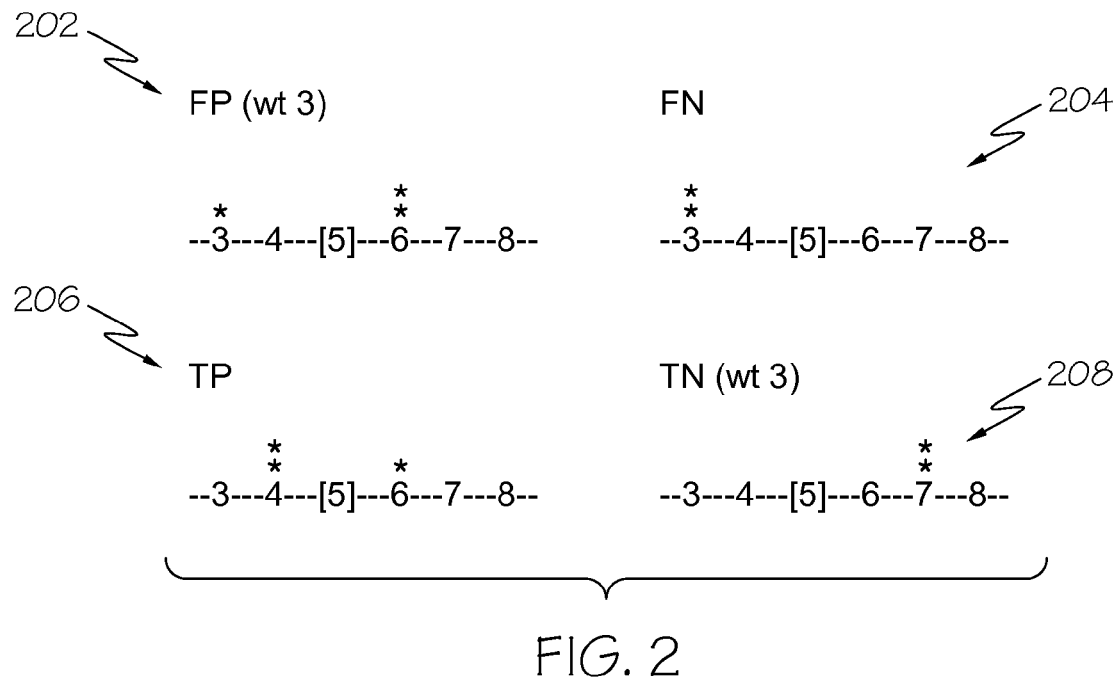
FIG. 2 illustrates examples of histograms for classifying structured differential learning decisions as one of false positives, false negatives, true positives, and true negatives, according to one embodiment of the present invention.

The SDL module 102 uses histograms to quantize the four categories of decisions separately for each parameter, where the x axis is the alternative value and the y access is how many instances proposed this value. FIG. 2 shows an example of these histograms. In particular, FIG. 2 shows that for the histogram 202 associated with FPs that an alternative value of 3 was proposed 1 time while an alternative value of 6 was proposed 2 times. With respect to the histogram 204 for FNs the alternative value of 3 was proposed 2 times. With respect to the histogram 206 for TPs an alternative value of 4 was proposed 2 times and the alternative value was proposed 1 time. With respect to the histogram 208 for TNs an alternative value of 7 was proposed 2 times.

For example, for a headlight controller discussed above (and in FIG. 4) suppose on a given frame the SDL module 102 determined that an on-coming car was not detected and that the high-beams HB should be activated, but the ground truth data 114 indicated that the low-beams LB should be activated. This is a false positive—false because it was wrong, and positive because it called for high-beams (output line=1). The trace element in decision database 110 for this given frame includes the information <37, ymin, 103>. This means the confidence of the SDL module 102 was 37 (out of 100) and that it selected HB since the confidence is positive (i.e., above 0). The trace element also indicates that if you want to change the decision to LB you should change the ymin threshold to 103 (from, for example, 100 originally). Thus, the bin corresponding to 103 in the FP histogram of the ymin feature gets incremented (usually by 1 although sometimes it is advantageous to use other data weighting schemes).

Generally, errors of various types are weighted differently: FPs might be 3 times as damaging as FNs. This is taken into account by multiplying the FP and TN histograms 202, 208 by 3 first. The SDL module 102 then analyzes the effect of changing the threshold 106 associated with a feature type to one of the alternative values. If it was a FP event, the change transforms this into a TN. Conversely, if it was a TP event, the decision is transformed to a FN event. The SDL module 102 captures this by creating a single histogram by subtracting off the correct events from the wrong events. For instance, B (benefit)=(3*FP+FN)−(TP+3*TN) where the 3's are the weighting factor. Thus the amount of correction or "benefit" provided by each alternative parameter/threshold value is explicitly tabulated by the SDL module 102.

Figure 3:
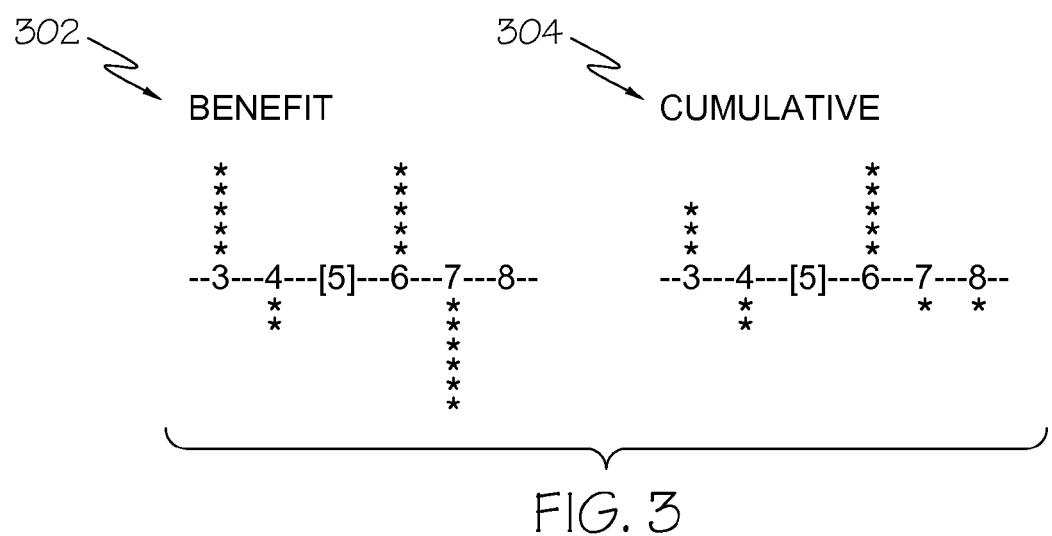
FIG. 3 illustrates examples of a benefit histogram and a cumulative benefit histogram according to one embodiment of the present invention.

FIG. 3 shows a benefit histogram 302 and a cumulative benefit histogram 304 corresponding to the particular error histograms in FIG. 2. The actual effect of changing the feature/parameter threshold value to some other value is the sum of all benefits between the original value and the new value. To help catalog this, the SDL module 102 generates the cumulative histogram 304 of the benefit function away from the original value. The highest value of this graph is thus the alternative value for the feature parameter/threshold that will likely produce the highest reduction in error rate. If there are several values that are tied, then the value closest to the original value is selected. In cumulative graph 304 of FIG. 3 the original value was 5, but it can be seen that 6 is the best choice for highest system performance. This value fixes the most errors while introducing the fewest new ones (with weighting taken into account).

Generally this adjustment procedure is done for each parameter/threshold value independently to arrive at a new set of values. In one embodiment, parameter/threshold values can be adjusted only when the new setting will fix at least a certain number of events (such as 10). The number of events fixed can be found by performing the summation and accumulation described above, but with FPs and FNs weighted equally. Once the new set of values is determined the thresholds 106 can be adjusted accordingly.

Operational Flow Diagrams

Figure 4:
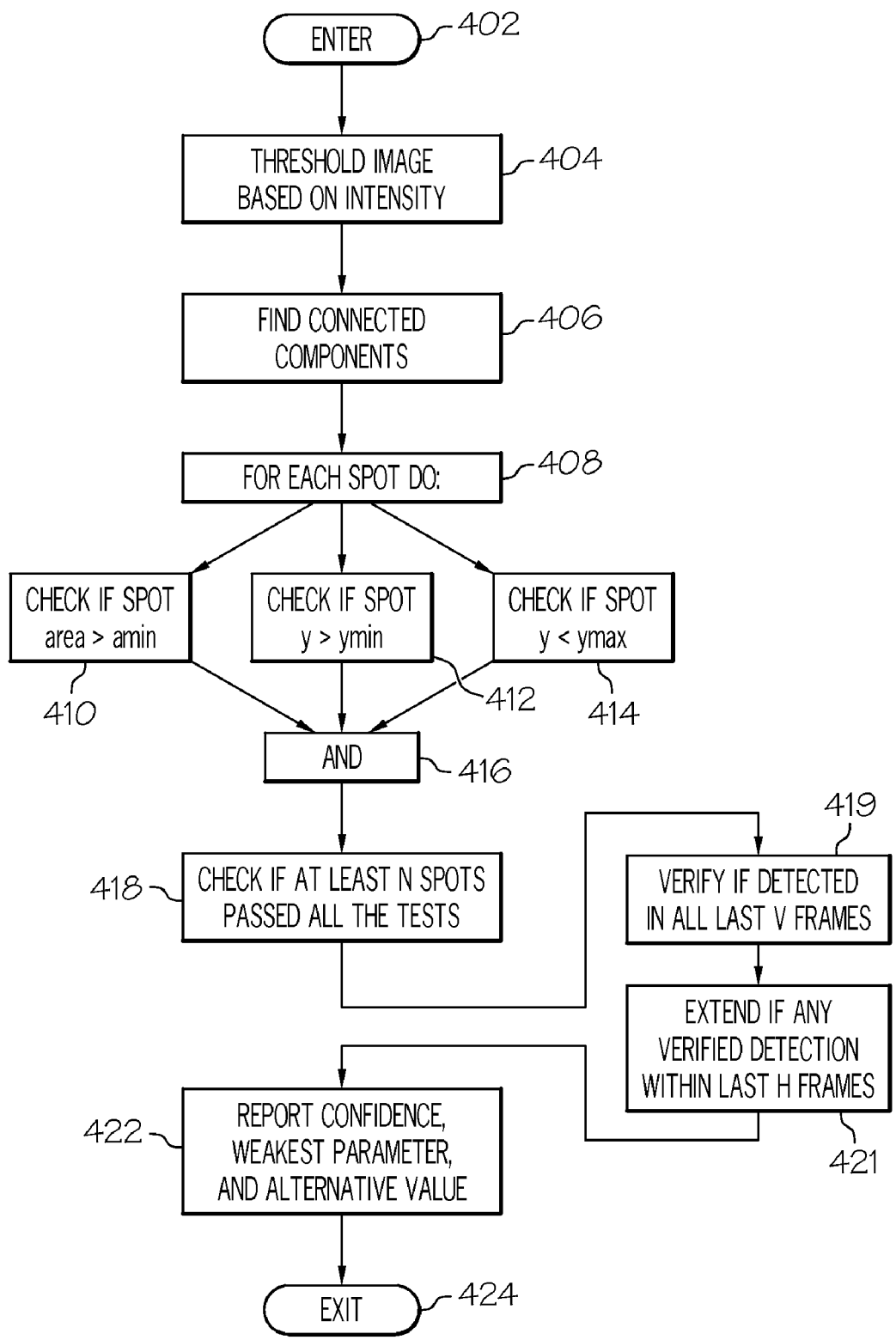
FIG. 4 is an operational flow diagram illustrating one example of making a decision with respect to a given task using the structured differential learning system, according to one embodiment of the present invention.

FIG. 4 is an example operational flow diagram illustrating a process for making a decision with respect to a given task using the structured differential learning system 100. The operational flow diagram begins at step 402 and flows directly into step 404. The SDL module 102, at steps 404-408, extracts features such as spot brightness, spot intensity, spot area, and the like from a set of input data 114. In the example used above, these features can be associated with an object within the input data such as a headlight, taillight, street light, etc.

The SDL module 102 can identify bright/dim spots/blobs within a video frame by thresholding the image (video frame) based on intensity in step 404. In other words, the SDL module 102 identifies spots with intensity above a given threshold. The SDL module 102 then generates a binary image (each pixel either 1 or 0) marking where the bright lights are within the input data 114 (e.g., image frame).

The SDL module 102, at step 406, aggregates these pixels in connected regions where a pixel is considered "connected" to another if it is immediately adjacent either vertically or horizontally. The output of this is a number of targets objects (e.g., discrete "spots" which might possibly be headlights of on-coming cars). The SDL module 102, at step 406, also computes various features of each spot, such as its brightness and bounding box.

The SDL module 102, at step 408, then initiates a comparison operation for extracted feature associated with an object within the video frame against one or more parameters 106 for the given feature type. For example, if the object of interest (the current object the SDL module is testing for) is a headlight and this object has three features associated with it such as amin, ymin, and ymax, the SDL module 102 will use the parameters 106 associated with these feature types in the comparison test(s). The SDL module 102, at steps 410-414, then compares each feature of the spot to the corresponding parameters 106. For example, the SDL module 102 determines if the extracted feature of the current object has a value above, below, or equal to a corresponding parameter 106.

The SDL module 102, at step 416, combines the comparison test results using a logical operator such as AND. This also generates an overall confidence value (e.g., a confidence value that indicates how confident the system 100 is in the decision that spot being or not being a headlight) and the SDL module 102 can identify one of the features (e.g., amin, ymin, or ymax) as having the weakest threshold/parameter and records the associated alternative value identified for the parameters 106 associated with this feature.

The SDL module 102, at step 418, checks if there are at least N target objects (e.g., spots/blobs) that have passed all of the comparison tests indicating that they are objects of interest. The SDL module 102, at step 419 determines if the last V frames have sufficient spots and performs, at step 421, the temporal extending operation if detection was verified within the last H frames. The SDL module 102, at step 422, then outputs a confidence associated with the decision at step 418 and also identifies a parameter/threshold 106 and a value to change this parameter to if this decision turns out to be incorrect. The control flow then exits at step 424. The above operations are performed for every input frame received and the triples <confidence, weakest feature/parameter, alternative value> are concatenated to form a "trace" for the input data (e.g., video).

Figure 5:
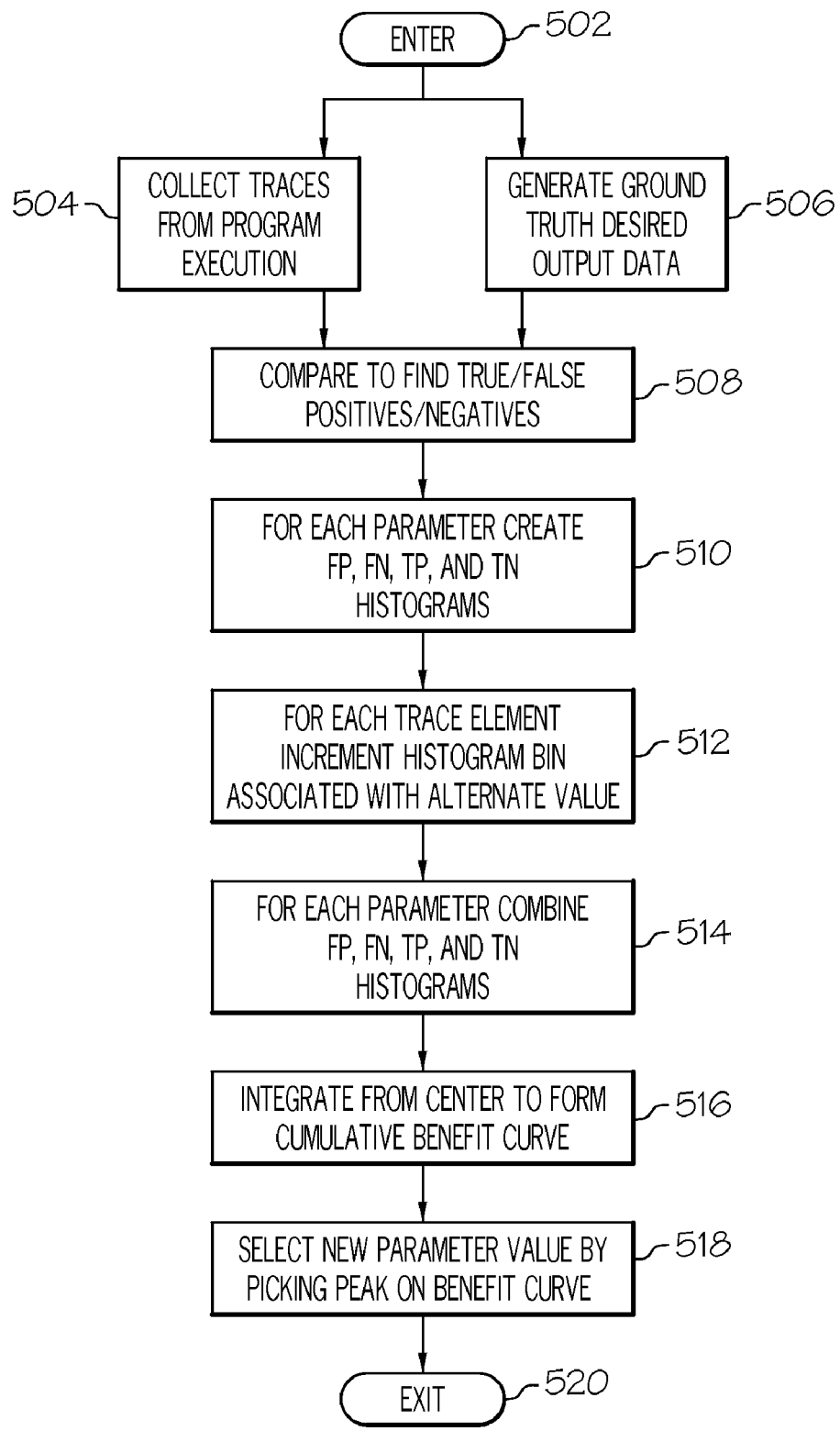
FIG. 5 is an operational flow diagram illustrating one example of adjusting a parameter in an SDL system for obtaining increased performance according to one embodiment of the present invention.

FIG. 5 is an operational flow diagram illustrating one example of adjusting a parameter in an SDL system for obtaining increased performance. The operational flow diagram of FIG. 5 begins at step 502 and flows directly into step 504. The SDL module 102, at step 504, retrieves traces from prior executions. In other words, the SDL module retrieves decision information from the decision information database 110 that includes weakest threshold/parameter information and confidence score information.

Ground truth data 112 is also generated either in a parallel process or can be previously generated and retrieved by the SDL module 102 at step 506. As discussed above, ground truth data 112 is the desired decision for each video frame.

The SDL module 102, at step 508, compares the decision information for each input data 114 to the corresponding ground truth data 112 to identify the true/false positives/negatives. The SDL module 102, at step 510, creates an FP, FN, TP, TN histogram for each threshold/parameter. Since the trace also indicates the weakest threshold/parameter for each frame of the video, each classified frame can be assigned to the relevant FP, TP, FN, or TN histogram for that one threshold/parameter. These histograms have separate bins for each possible alternative value for the threshold/parameter. Therefore, the SDL module 102, at step 512, increments the histogram bin that is associated with the alternative value for each threshold/parameter.

The SDL module 102, at step 514, combines the FP, FN, TP, TN histograms for each feature/parameter to create a composite benefit histogram. The SDL module 102, at step 516, then creates a cumulative benefit curve. For example, the composite histogram is integrated outwards from the nominal value (e.g. 100) to give the final "benefit" curve. The SDL module 102, at step 516, selects a new value for each threshold/parameter by identifying the peak in its associated benefit curve. The SDL module 102 can then adjust each threshold/parameter 106 using the new value or notify the user of the new value. The control flow exits at step 518.

Information Processing System

Figure 6:
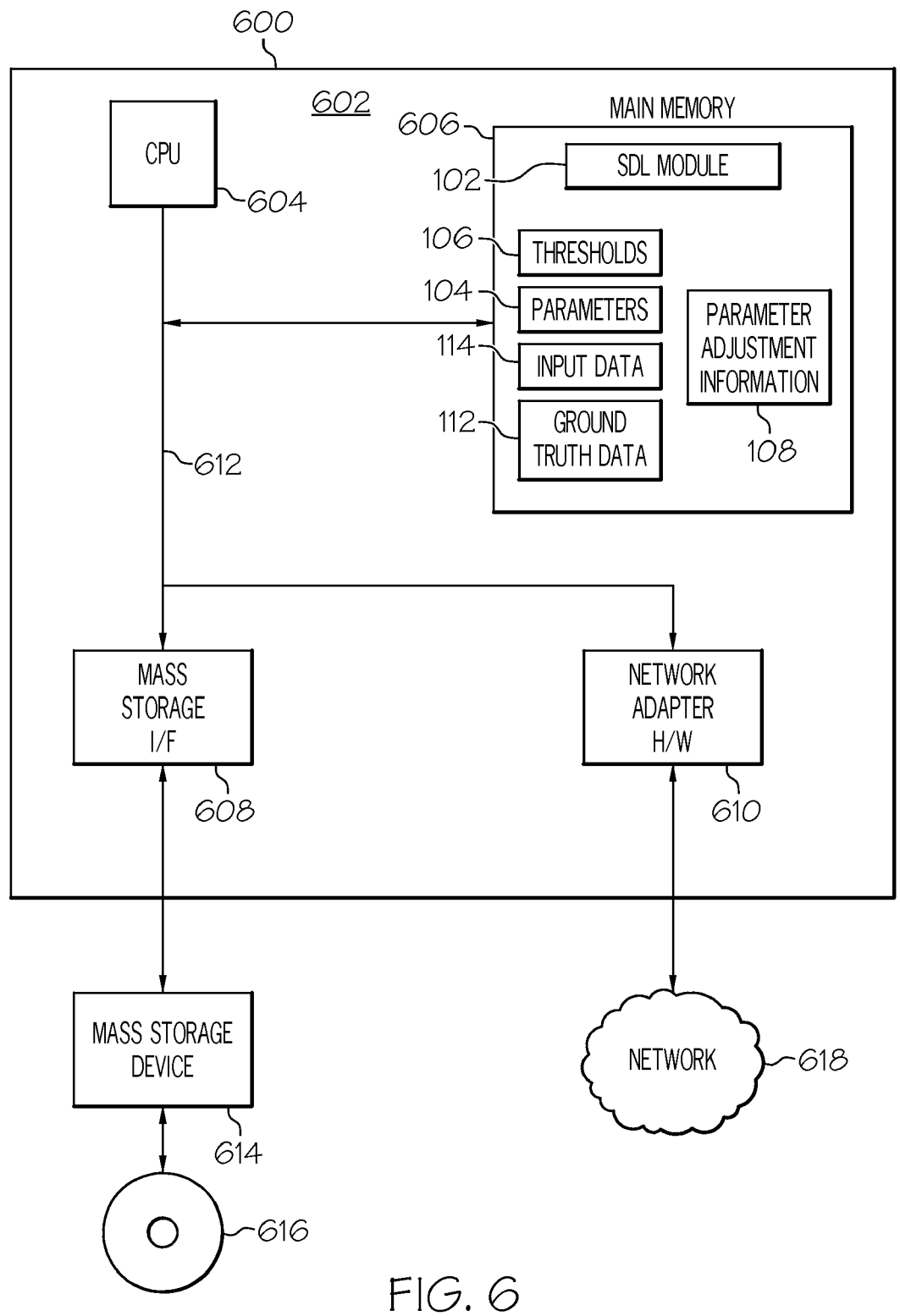
FIG. 6 is a block diagram illustrating a detailed view of an information processing system according to one embodiment of the present invention.

FIG. 6 is a block diagram illustrating a more detailed view of an information processing system 600 that can be utilized to perform one or more embodiments of the SDL system 100 of FIG. 1. The information processing system 600 is based upon a suitably configured processing system adapted to implement the exemplary embodiment of the present invention. Similarly, any suitably configured processing system can be used as the information processing system 600 by embodiments of the present invention.

The information processing system 600 includes a computer 602. The computer 602 has a processor(s) 604 that is connected to a main memory 606, mass storage interface 608, and network adapter hardware 610. A system bus 612 interconnects these system components. The main memory 606, in one embodiment, comprises the SDL module 102 and its modules discussed above. The main memory 606 can also include, the one or more thresholds 106, the parameter adjustment information 108, the decision information 110, the input data 114, the ground truth data 112, and the feature extraction module 131. The mass storage interface 608 is used to connect mass storage devices, such as data storage device 614, to the information processing system 600. One specific type of data storage device is an optical drive such as a CD/DVD drive, which may be used to store data to and read data from a computer readable medium or storage product such as (but not limited to) a CD/DVD 616. Another type of data storage device is a data storage device configured to support, for example, NTFS type file system operations.

In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and mass storage device 612. Note that the term "computer system memory" is used herein to generically refer to the entire virtual memory of the information processing system 600.

Although only one CPU 604 is illustrated for computer 602, computer systems with multiple CPUs can be used equally effectively. Various embodiments of the present invention further incorporate interfaces that each includes separate, fully programmed microprocessors that are used to off-load processing from the CPU 604. An operating system (not shown) included in the main memory is a suitable multitasking operating system such as the Linux, UNIX, Windows XP, and Windows Server operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 600. The network adapter hardware 610 is used to provide an interface to a network 618. Various embodiments of the present invention are able to be adapted to work with any data communications connections including present day analog and/or digital techniques or via a future networking mechanism.

Although the various example embodiments of the present invention have been discussed in the context of a fully functional computer system, those of ordinary skill in the art will appreciate that various embodiments are capable of being distributed as a program product via CD or DVD, e.g. CD 616, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for training a control system using structured differential learning, the method comprising:
   analyzing, by a plurality of analyzing components, a set of features extracted from a set of input data;
   generating, by each analyzing component in the plurality of analyzing components, for each feature an output response regarding whether the each feature has an acceptable value associated therewith relative to a value of a parameter associated with the each analyzing component;
   associating a confidence score with the each output response;
   combining each output response and each confidence score into a single final output response and single final confidence score; and
   identifying, based at least on the confidence score, which analyzing component in the plurality of analyzing components is a strongest candidate for generating an incorrect final output response.

2. The method of claim 1, wherein associating a confidence score with the each output response further comprises:
   determining that the acceptable value is one of above and below the value of the parameter; and
   determining one of a distance above and a distance below the value of the parameter in which the acceptable value is.

3. The method of claim 1, further comprising:
   determining an alternative value for the parameter for the analyzing component that has been identified as the strongest candidate for generating an incorrect final output response, wherein the alternative value for the parameter changes the incorrect final output response to a correct final output response.

4. The method of claim 1, wherein the combining is further based on at least one combination operation that utilizes a logical operator.

5. The method of claim 1, wherein identifying which analyzing component in the plurality of analyzing components is a strongest candidate for generating an incorrect final output response further comprises:
- analyzing the confidence score for each output response; and
- identifying, based on the analyzing, the analyzing component associated with a lowest confidence score.

6. The method of claim 1, wherein the combining further comprises counting output responses above a threshold.

7. The method of claim 1, wherein the combining further comprises:
- analyzing a set of output responses generated by at least one analyzing component in the plurality of analyzing components over a given window of time.

8. The method of claim 7, further comprising:
- combining the set of output response with at least one logical operator.

9. The method of claim 1, wherein generating for each feature an output response further comprises at least one of:
- generating an output response that is based on a fraction of a set of data associated with the feature being below a given value threshold; and
- generating the output response based on a spatial projection.

10. The method of claim 1, further comprising:
- comparing the final output response to a corresponding ground truth data element, wherein the corresponding ground truth data element correctly indicates a correct response for the set of features.

11. The method of claim 10, further comprising:
- determining that the final output response is incorrect based on comparing the final output response to the corresponding ground truth data element; and
- adjusting, in response to determining that the final output response is incorrect, the value of the parameter associated with the analyzing component that has been identified as the strongest candidate, wherein the adjusting is based on an alternative value for the parameter that changes the incorrect final output response to a correct final output response.

12. The method of claim 10, wherein the comparing the final output response to a corresponding ground truth data element further comprises:
- classifying the final output response as one of a false positive, false negative, true positive, and true negative with respect to the corresponding ground truth element.

13. The method of claim 12, further comprising:
- generating a histogram for each of the false positive, false negative, true positive, and true negative classifications, wherein the histogram includes one or more alternative values for the parameters associated with the histogram and a total count of occurrences for the one or more alternative values, wherein the one or more alternative values for the parameters change the final output response.

14. The method of claim 13, further comprising:
- creating a benefit histogram from each of the histograms generated for the false positive, false negative, true positive, and true negative classifications, wherein the benefit histogram indicates a one of a benefit gained and lost by changing the value of the parameter associated with the analyzing component that has been identified as the strongest candidate to the one or more alternative values.

15. A method for training a control system using structured differential learning, the method comprising:
- comparing each response information set in a plurality of response information sets from a structured differential learning module to a corresponding ground truth data element, wherein each response information set indicates a set of responses generated by the structured differential learning module with respect to a set of features extracted from a set of input data, wherein the corresponding ground truth data element indicates a correct response with respect to the set of features, and wherein each response information set is associated with a trace information set comprising at least an one or more alternative values and a feature analyzing component identifier associated with a feature analyzing component that the response information set was based on and that is adjustable by the one or more alternative values;
- classifying, based on the comparing, each response information set as one of correct and incorrect; and
- for each incorrect response information set, selecting an alternative value for adjusting the feature analyzing component in the trace information set based on all the alternative values for each response information set that is one of correct and incorrect and comprises the same feature analyzing component in the trace information set.

16. The method of claim 15, wherein selecting the alternative value for adjusting the feature analyzing component further comprises:
- generating a histogram associated with the feature analyzing component in the trace information set comprising all associated alternative values obtained from the trace information sets in the plurality of response information sets and a count for each of the associated alternative values.

17. The method of claim 16, wherein selecting the alternative value for changing the feature analyzing component further comprises:
- comparing the count for each of the associated alternative values; and
- selecting, based on the comparing, an associated alternative value having a highest count.

18. The method of claim 15, wherein the trace information set includes a confidence score indicating a degree of certainty with respect to the response information set associated with the trace information set.

19. The method of claim 15, wherein the classifying further includes:
- classifying each response information set as one of a false positive, false negative, true positive, and true negative.

20. The method of claim 19, wherein at least one of the false negative and true negative classifications are weighted by a given factor.

21. The method of claim 15, wherein at least one response information set is weighted by a given factor.

22. The method of claim 15, further comprising:
- adjusting, in response to the selecting, the feature analyzing component within the trace information set for at least one of the incorrect response information sets with the alternative value that has been selected.

23. An information processing system for training a control system using structured differential learning, the information processing system comprising:
- a memory;
- a processor communicatively coupled to the memory; and a structured differential learning module communicatively coupled to the memory and the processor, wherein the structured differential learning module is adapted to:

analyze, by a plurality of analyzing components, a set of features extracted from a set of input data;

generate, by each analyzing component in the plurality of analyzing components, for each feature an output response regarding whether the each feature has an acceptable value associated therewith relative to a value of the parameter associated with the each analyzing component;

associate a confidence score with the each output response;

combine each output response and each confidence score into a single final output response and single final confidence score; and identify, based at least on the confidence score, which analyzing component in the plurality of analyzing components is a strongest candidate for generating an incorrect final output response.

24. The information processing system of claim 23, wherein the structured differential learning module is further adapted to:

determine an alternative value for the parameter for the analyzing component that has been identified as the strongest candidate for generating an incorrect final output response, wherein the alternative value changes the incorrect final output response to a correct final output response.

25. An information processing system for training a control system using structured differential learning, the information processing system comprising:

a memory;

a processor communicatively coupled to the memory; and a structured differential learning module communicatively coupled to the memory and the processor, wherein the structured differential learning module is adapted to:

generate a plurality of response information sets, wherein each response information set indicates a set of responses with respect to a set of features extracted from a set of input data;

compare each response information set in the plurality of response information sets to a corresponding ground truth data element, wherein the corresponding ground truth data element indicates a correct response with respect to the set of features, and wherein each response information set is associated with a trace information set comprising at least an one or more alternative values and a feature analyzing component identifier associated with a feature analyzing component that the response information set was based on and that is adjustable by the one or more alternative values;

classify, based on the comparing, each response information set as one of correct and incorrect; and for each incorrect response information set, select an alternative value for adjusting the feature analyzing component in the trace information set based on all the alternative values for each response information set that is one of correct and incorrect and comprises the same feature analyzing component in the trace information set.

* * * * *